United States Patent [19]

Massey

[11] Patent Number: 4,547,241

[45] Date of Patent: Oct. 15, 1985

[54] METHOD AND APPARATUS FOR HEATING PRESSURE VESSEL USED IN TIRE RETREADING SYSTEM

[76] Inventor: Joe I. Massey, 2740 Village Terr., Springfield, Mo. 65807

[21] Appl. No.: 514,879

[22] Filed: Jul. 18, 1983

[51] Int. Cl.⁴ .............................................. B29H 5/04
[52] U.S. Cl. ...................... 156/96; 156/382; 156/909; 264/36; 425/18
[58] Field of Search ................ 156/96, 909, 381–382; 425/18, 17, 40; 264/36

[56] References Cited

U.S. PATENT DOCUMENTS

| | | | |
|---|---|---|---|
| 2,069,090 | 1/1937 | Hawkinson | 156/96 |
| 3,091,802 | 6/1963 | Rawls | 425/18 |
| 3,971,668 | 7/1976 | Pickard et al. | 156/382 |
| 4,201,610 | 5/1980 | Brodie et al. | 156/96 |
| 4,269,644 | 5/1981 | Goldstein | 156/96 |
| 4,310,374 | 1/1982 | MacMillan | 425/18 |
| 4,434,018 | 2/1984 | Brewer | 156/96 |

FOREIGN PATENT DOCUMENTS 234632  2/1945  Switzerland ................. 425/18

Primary Examiner—Lois E. Boland
Attorney, Agent, or Firm—Harvey B. Jacobson

[57] ABSTRACT

A method and apparatus for heating pressure vessels used in the tire retreading and tire repairing industry which includes a plurality of heat exchangers in the form of plate coils associated with the pressure vessel with steam being circulated through the plate coils for heating the pressure vessel to a temperature required for vulcanizing rubber. Steam is supplied from a boiler and returned to a condensate return tank through valves and traps in order to provide a closed loop system with the steam being produced by the boiler passing through steam lines into the upper end portions of the plate coils which are attached to the pressure vessel, either interiorly or exteriorly, in a manner to radiate heat into the insulated pressure vessel in order to raise the temperature interiorly of the vessel to that required for vulcanizing rubber. As heat is radiated from the plate coils into the pressure vessel, the steam in the plate coils will be cooled and condensed and forced into a float operated trap and when the water level in the trap builds up, the float valve therein is opened and the condensate water is forced through a condensate return line into a condensate return tank with this circulation of the steam through the plate coils maintaining substantially constant temperature in the pressure vessel. The condensate return tank is provided with a feed water line to maintain a desired water level by the use of a float valve with a water pump being activated to pump the water back into the boiler where it is heated for passage into the plate coils thereby providing a closed loop system with the feed water line, of course, maintaining proper water levels in the system.

2 Claims, 3 Drawing Figures

4,547,241

METHOD AND APPARATUS FOR HEATING PRESSURE VESSEL USED IN TIRE RETREADING SYSTEM

BACKGROUND OF THE INVENTION

1. Field of the Invention

The present invention generally relates to tire retreading and repairing and more particularly to a method and apparatus for heating a pressure vessel to a temperature required for vulcanizing rubber so that a tire casing with a new tread or a tire casing with repairs placed in the pressure vessel in a manner well known in the art will be subjected to the required pressure and temperature without the heating medium being discharged into the vessel thereby enabling the heating medium to be circulated in a closed loop system thereby providing a more efficient tire retreading or repairing procedure.

2. Description of the Prior Art

Tire retreading and repairing procedures are well known in which the new tread or repair is subjected to pressure and temperature conditions within a vessel. In one presently used method, a strip of rubber is applied to a prepared casing for rebuilding or repairing a worn tire. The strip of rubber may be a pre-vulcanized tread, commonly referred to as a pre-cured tread, or the strip of rubber may be a strip of unvulcanized rubber. The pre-cured tread method is used extensively in the retreading of tires, particularly truck tires. In this method, a pre-cured strip of rubber is applied to a prepared casing with a thin strip of unvulcanized bonding layer, referred to as a cushion gum, being sandwiched between the casing and the tread. This cushion gum contains bonding chemicals and bonds or welds the new tread to the casing. In order to obtain a bond, the cushion gum must be subjected to a predetermined temperature and pressure with different systems requiring different temperatures and pressures. After the tread and cushion gum is applied to the prepared casing, an envelope in the form of an airtight flexible sheath is placed over the outside of the tread and tire which is then mounted on a wheel or rim and the envelope is sealed by the rim flange or in other various ways and the tire is inflated and placed in a pressure vessel.

In the system using unvulcanized strips of rubber, a strip of uncured or unvulcanized rubber is applied to a prepared casing which can be accomplished by extruding ribbons of rubber directly to the prepared casing or by applying a preextruded strip of rubber, either by hand or by machine. Cushion gum may or may not be used in this system. In any event, after the rubber is applied to the prepared casing, a rubber or flexible mold is put over the uncured rubber and it is then covered with an envelope in the same manner as in precured tread system, mounted on a wheel or rim with the envelope sealed, placed in the pressure vessel where it is subjected to pressure and heat for a predetermined time at which time the strip of rubber is bonded and molded.

The most popular method of applying heat in the pressure vessel is by the use of electrical heating elements. Another procedure employs the introduction of live steam into the pressure vessel. The use of electrical heating elements is very expensive and is dangerous because of potential fires. Electrical heating elements attain a temperature in excess of 900° F. which requires that air must be constantly circulated over the heating elements. In most cases, the heating elements are located in an air duct in the pressure vessel which is above the tires. There have been occasions when a heating element falls and drops down into the duct and burns its way through the duct and onto the tires and the tires are ignited thus causing a dangerous fire situation. Electrical energy is quite expensive to use and pressure vessels which are heated with electrical energy cannot be pre-heated economically thus requiring considerable time in which to heat the pressure vessel after the prepared tires have been placed therein so that each "load" of tires placed in the pressure vessel requires considerable time for the tires to be subjected to the entire cycle of operation.

The following U.S. Patents relate to this subject matter but do not disclose a similar method or apparatus:
U.S. Pat. No. 2,025,993, Dec. 31, 1935
U.S. Pat. No. 3,329,748, July 4, 1967
U.S. Pat. No. 3,698,975, Oct. 17, 1972
U.S. Pat. No. 3,769,121, Oct. 30, 1973
U.S. Pat. No. 3,816,217, June 11, 1974
U.S. Pat. No. 4,370,283, Jan. 25, 1983

SUMMARY OF THE INVENTION

An object of the present invention is to provide a method and apparatus for heating pressure vessels used in tire retreading or tire repairing systems which utilizes plate coils mounted in heat exchange relation to the interior of a pressure vessel and physically mounted either inside or outside of the pressure vessel to heat the pressure vessel from a heating medium passing through the coils with the heating medium flowing in a closed loop system to provide an efficient heating system for the pressure vessel, a heating system which eliminates the possibility of fires occurring and a heating system which enables the pressure vessel to be pre-heated thereby reducing the time required for each load of tires placed in the vessel to be subjected to a complete cycle of operation.

Another object of the invention is to provide a method and apparatus in accordance with the preceding object in which the heat exchange medium is steam produced by a boiler incorporated into the closed loop system with the steam being cooled in the plate coils and condensate collected in a trap and ultimately returned to a condensate return tank and pumped back into the boiler with the condensate tank including a liquid feed to maintain a proper level of liquid in the closed loop system thereby maintaining a constant temperature in the pressure vessel and enabling the pressure vessel to be pre-heated and completely isolating the heating medium from contact with the tires within the pressure vessel with the pressure in the pressure vessel being maintained by regulated air pressure communicating therewith in a conventional manner.

A further object of the invention is to provide a method and apparatus in accordance with the preceding objects in which the plate coils forming a portion of the closed loop system are oriented over a maximum portion of the length and periphery of the pressure vessel to more evenly distribute the heat within the pressure vessel with the plate coils conforming generally to the usually cylindrical configuration of the pressure vessel so that tires can be easily loaded into or removed from the pressure vessel through one openable end thereof with the tires being supported in the usual manner from a track, roller carriage and hanger assemblies.

Still another object of the invention is to provide a method and apparatus in accordance with the preceding objects which is efficient in operation, effective for maintaining a constant predetermined required temperature in the pressure vessel and which reduces the time required to subject a tire or group of tires to a complete cycle of operation and substantially eliminates the danger of fires occurring in the pressure vessel.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
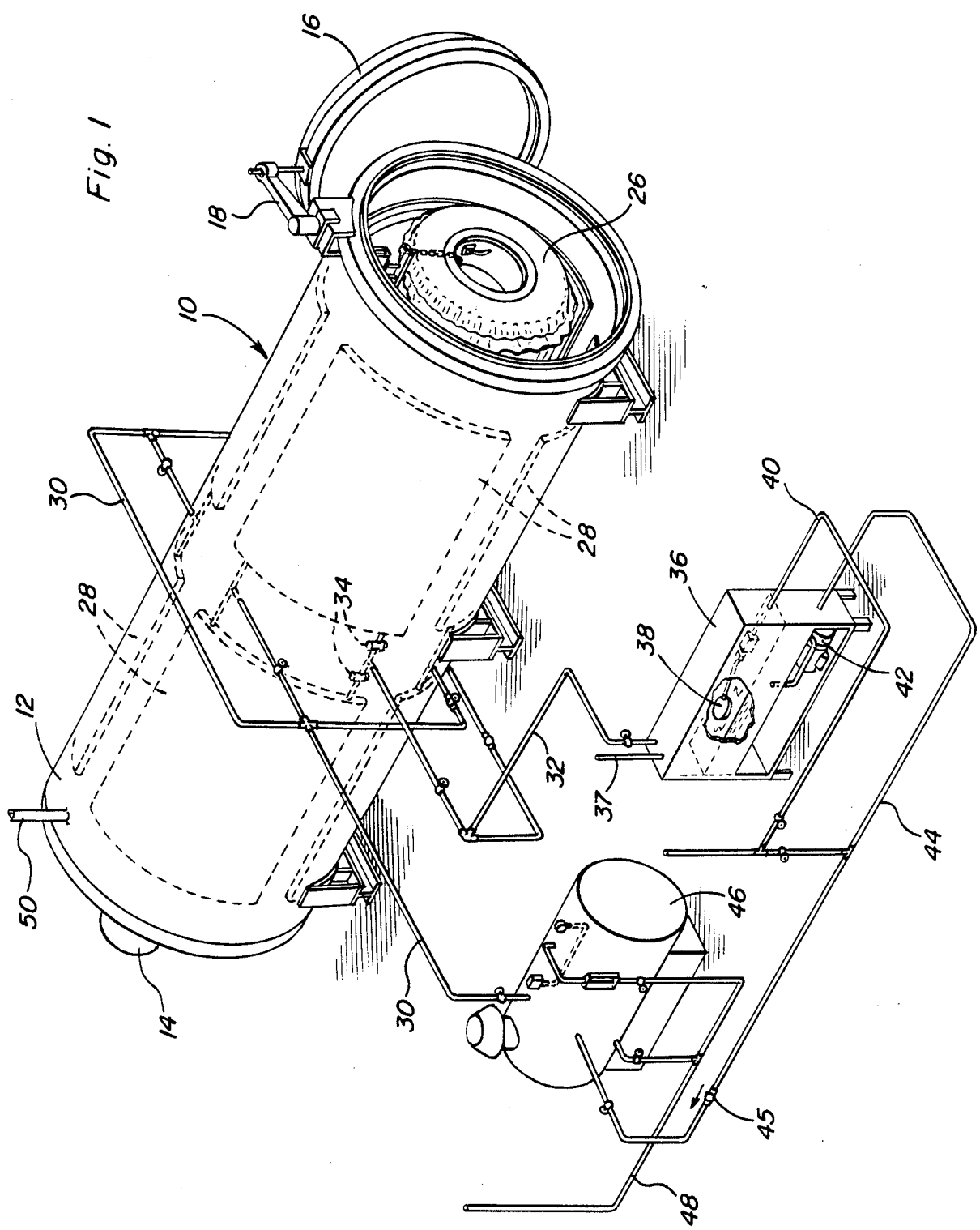
FIG. 1 is a schematic prespective view of the method and apparatus incorporating the principles of the present invention therein.
Figure 2:
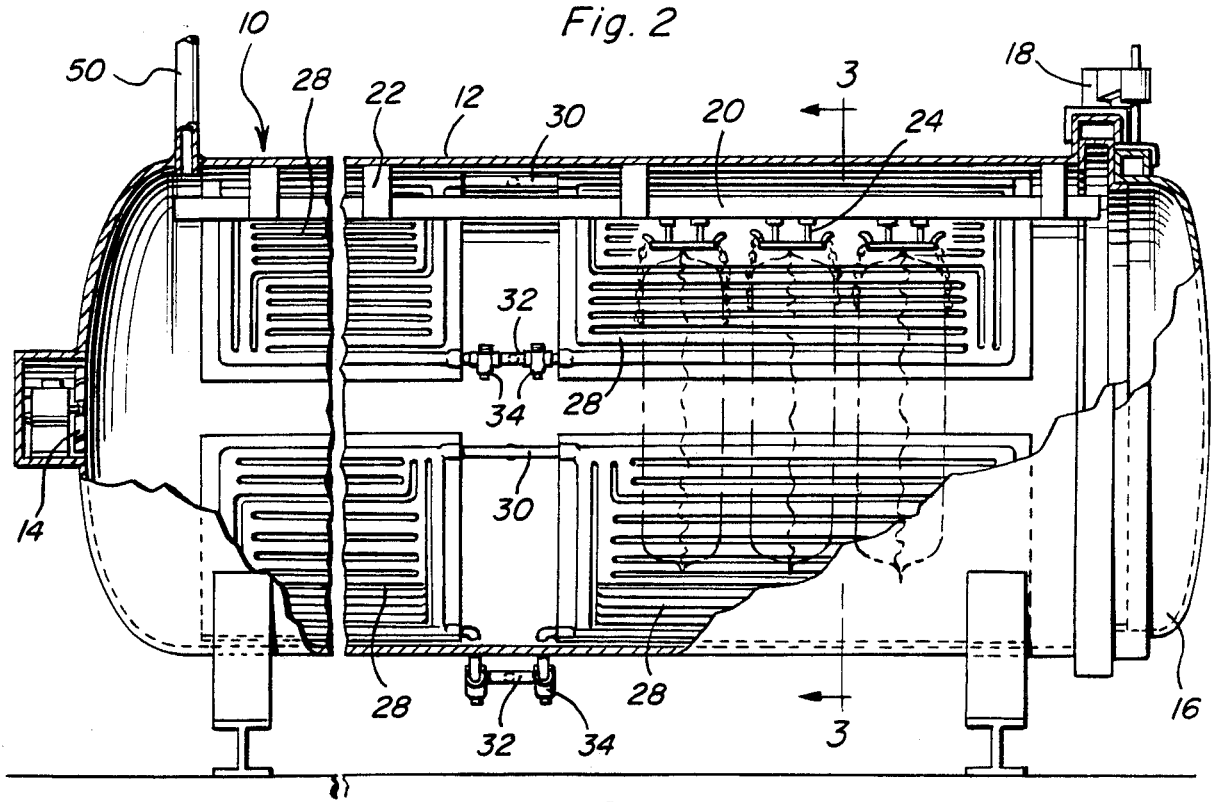
FIG. 2 is a longitudinal, partial sectional view of the pressure vessel illustrating the plate coils associated therewith and the structure for supporting the tires being retreaded.
Figure 3:
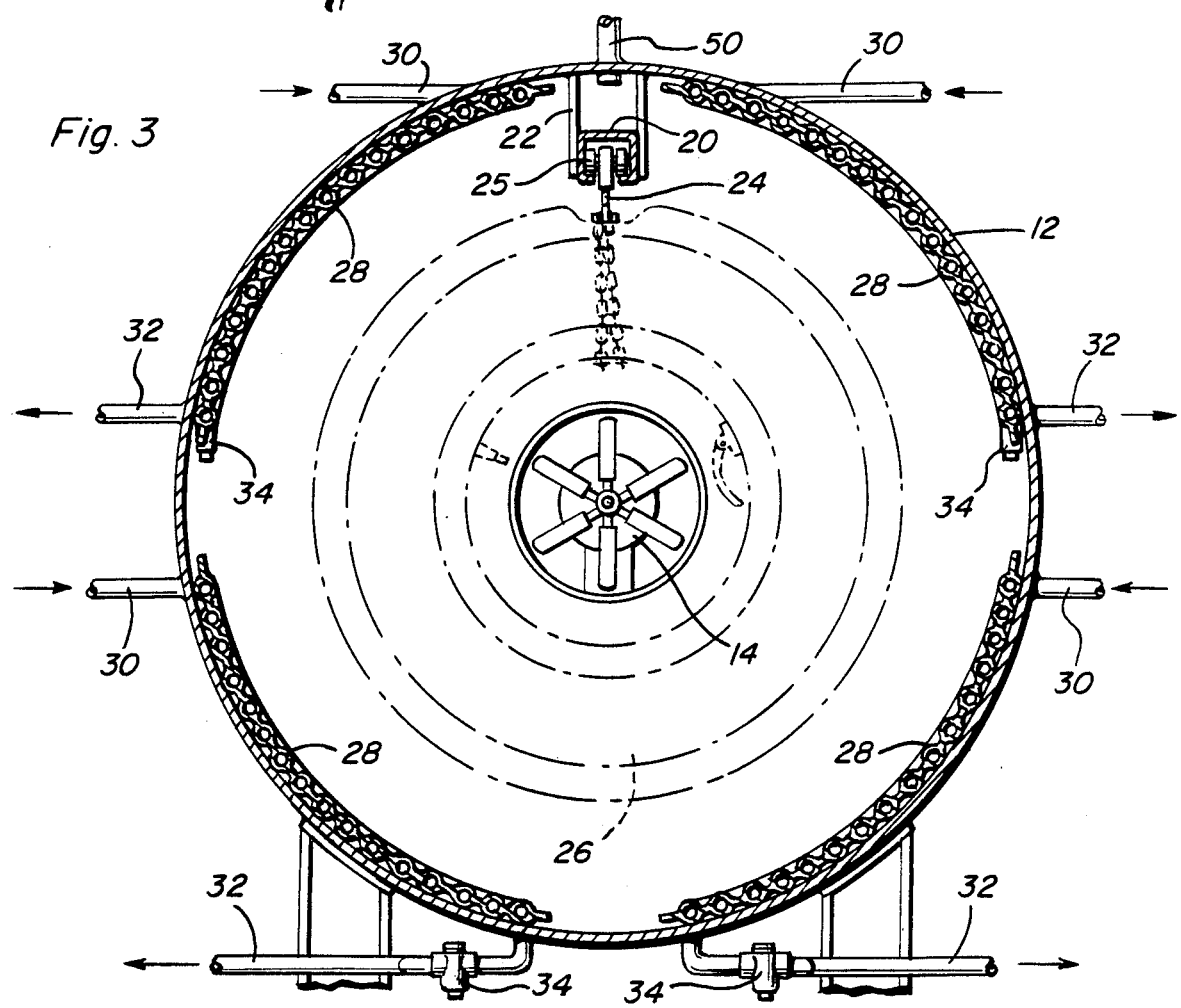
FIG. 3 is a transverse, sectional view taken substantially upon a plane passing along section line 3—3 of FIG. 2 illustrating further structural details of the invention.

Referring now specifically to the drawings, the method and apparatus of the present invention is illustrated in association with a pressure vessel which is substantially conventional except for the modifications which have been made to incorporate the present invention therein. The pressure vessel is generally designated by the numeral 10 and is in the form of an elongated, generally cylindrical vessel or tank having a cylindrical peripheral wall 12 which may be insulated in a conventional manner. One domed end of the vessel 10 may be provided with an air circulating fan 14 while the other domed end is formed as a door or closure member 16 supported by a conventional support structure 18 by virtue of which the door may be retained tightly closed sealed relation or swung to an out-of-the-way open position as illustrated in FIG. 1. Positioned internally of the pressure vessel 10 is a longitudinally extending track 20 supported in depending relation from the top of the wall 12 by supporting brackets 22. A plurality of supporting hangers or carriages 24 are supported from the track 20 by roller assemblies 25. The hangers 24 support tire assemblies 26 to be retreaded or repaired in a conventional and well known manner so that the tire assemblies may be inserted into or removed from one end of the pressure vessel 10 by movement of the support hangers 24 longitudinally of the track 20 so that the tire assembly 26 is supported generally concentrically of the peripheral wall 12 as illustrated in the drawings. The aforementioned structure of the vessel 10 and the support structure for the tires as well as the door or closure for the vessel represents conventional structural arrangements utilized in the tire retreading and repairing industry.

The apparatus of the present invention includes a plurality of plate coils 28 supported about the periphery of the wall 12 with eight plate coils 28 being illustrated although this number may vary depending upon the installational requirements. The plate coils 28 are oriented in peripherally and longitudinally spaced relation and may be supported interiorly of the peripheral wall 12 or exteriorly thereof but interiorly of any insulation so that heat from the heat exchange medium passing through the plate coils 28 will radiate inwardly to elevate the temperature in the pressure vessel 10 to a desired temperature level required for retreading or repairing tires in a manner set forth hereinafter.

Each of the plate coils 28 is communicated with a steam inlet line 30 connected to the upper end of the plate coil and a steam outlet line 32 is connected to the bottom end of each plate coil 28 with each of the steam outlet lines including a float valve type of steam trap 34. Plate coils such as those designated by reference numeral 28 are commercially available units for use with steam with the length and width of the plate coil and the orientation of the steam inlets and outlets being varied depending upon the installation requirements. The plate coils may be supported from the peripheral wall 12 of the pressure vessel with the steam inlet and outlet lines passing through the peripheral wall if the plate coil is interiorly of the wall 12 with the plate coils 28 being easily secured in place by suitable mounting brackets, clamps or the like. As illustrated in FIG. 1, the pair of plate coils at the upper portion of the pressure vessel are interconnected at their upper ends and a single steam line is connected to the connecting line between the pair of plate coils. Likewise, the lower ends of each pair of plate coils are interconnected by a line having steam traps therein with a condensate return line being connected to the connecting line between the traps. The traps are conventional condensate traps which include a float valve therein so that when condensate opens the float valve, steam pressure in the plate coil will force the condensate back through the condensate return line 32 to a condensate return tank 36 as illustrated in FIG. 1 with the return tank including a vent line 37 and a float control valve 38 in a feed line 40 so that the water level in the condensate return tank may be properly maintained at a desired level. A high pressure pump 42 communicates with the condensate return tank and discharges through line 44 and check valve 45 into a boiler 46 to which the steam line 30 is communicated. The boiler 46 is conventional and provided with the usual gauges, safety valves, fuel supply and combustion product discharge arrangement normally provided with a boiler with the boiler also including a feed line 48 to maintain proper liquid level in the boiler.

With this arrangement, steam produced by the boiler moves through the steam line 30 into the various plate coils 28. The plate coils which are attached to the inside or outside of the pressure vessel 10 radiates heat into the insulated pressure vessel. As the heat is radiated from the plate coils into the pressure vessel, the steam in the plate coils will cool and form condensation. When this occurs, the steam pressure in the plate coils forces the water into a float operated trap 34 and as water builds up in the trap, the float valve therein is opened and the steam pressure in the plate coils forces the water into the condensate return line 32 with the condensate flowing back into the condensate return tank 36 in a well known manner. As condensation evaporates through the vent 37, the water level is lowered in the condensate return tank 36 and a float valve 38 opens and allows added water to enter the tank through the feed water line 40 until the required level is obtained and at that time the float shuts off the valve. When the boiler calls for or requires additional water, the high pressure water pump 42 is actuated and the water is pumped through the boiler feed water line 44 and a one-way check valve 45 into the boiler 46. The water in the boiler is heated by combustion of a fuel in a conventional manner and steam is returned to the plate coils 28 through the steam line 30 to maintain a substantially constant temperature within the pressure vessel 10. The pressure within the pressure vessel is maintained by an air line 50 communicated with a source of compressed air through a pressure regulator to maintain the pressure within the pressure vessel at a desired level during the period in which the tire assemblies 26 are being subjected to a predetermined pressure and temperature required to properly retread or repair the tire.

The present invention may be used in conjunction with various tire retreading, rebuilding or repairing systems including those which are used with tires of different sizes and systems using the pre-cured tread method or the unvulcanized strip rubber method. In the pre-cured tread method, the new strip of rubber is a pre-vulcanized tread, that is, a tread molded separately from the casing with the pre-cured strip of rubber being applied to a prepared casing. The casing is prepared in the usual manner by using a buffing technique which trues the tire as it removes the old rubber inasmuch as the tire is inflated while it is being buffed. A thin strip of unvulcanized bonding layer, referred to as a cushion gum, is sandwiched between the prepared casing and the pre-cured tread. Usually, the cushion gum is applied to the inner surface of the pre-cured tread with the tread rubber and cushion being applied to the casing while it is inflated to its normal pressure so that the casing is in its normal running configuration when the tread is applied. In order for the cushion gum to securely bond the tread rubber to the casing, it must be subjected to heat and pressure which may vary depending upon the particular system used. This is accomplished by the use of an airtight flexible sheath or envelope which is applied to the tire assembly after the tread and cushion gum is applied to the casing. The envelope is placed over the outside of the tread and the tire with the tire being mounted on a wheel or rim and the envelope is sealed to the tire by the rim flange or by other standard procedures. In some systems, the tires may not be mounted but in all systems, in order to bond the tread rubber to the casing, the assembly including the cushion gum must be subjected to heat and pressure in a pressure vessel.

In the unvulcanized strip rubber system, the casing is prepared in the same manner but a strip of uncured or unvulcanized rubber is applied to the casing which can be accomplished by extruding ribbons of rubber directly to the prepared casing or by applying a pre-extruded strip of rubber to the casing and/or by machine. A cushion gum layer may or may not be used in this system. After the uncured rubber is applied to the prepared casing, a rubber or flexible mold is put over the uncured rubber and the assembly is then covered with the envelope as in the pre-cured tread system and the assembly is then placed in the pressure vessel for pressure and heat to bond and mold the uncured rubber to the tire casing.

Regardless of the exact system by which the new rubber is applied to the tire casing, a plurality of tire assemblies with the new rubber, cushion gum, if used, and the airtight envelope are mounted in the pressure vessel and the pressure vessel closed. Up to this point, the procedure is conventional and as set forth previously, various methods have been used to subject the interior of the pressure vessel to heat and pressure with the most popular method being the use of electrical heating elements which provide inherent fire danger due to the high temperature of the heating elements. Other systems utilize live steam which is injected directly into the pressure vessel. In both conventional procedures utilizing electrical heating elements or live steam, the pressure vessel cannot be pre-heated and live steam causes corrosion of the pressure vessel and electrical heating elements are quite expensive to operate and include a fire danger.

The plate coils forming the present invention produce a substantially constant temperature which can be accurately controlled and which operates safely with heat radiating inwardly from the plate coils which can be easily mounted interiorly or exteriorly of the insulated pressure vessel with the plate coils being in the form of honeycomb plates in which the passageways for the heat exchange medium are oriented in a desired pattern or arrangement depending upon the heating capacity needed.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. The method of retreading tires in a pressure vessel for receiving a load of tires to be retreaded consisting of the steps of introducing a plurality of tires to be retreaded into the interior of the vessel, closing the vessel, pressurizing the vessel, providing an isolated flow path for heat exchange media peripherally of the vessel in heat exchange relation to the interior of the vessel for heating the interior thereof to a temperature capable of retreading the tires and, eliminating deterioration of the interior of the vessel and the tires due to direct contact with heat exchange medium, said step of providing a flow path for heat exchange media including the step of positioning a coil plate heat exchanger along the interior surface of the vessel and extending the coil plate heat exchanger over a maximum portion of the length and interior periphery of the vessel to rapidly and evenly heat all of the interior of the vessel and the tires to be retreaded therein, communicating the coil plate heat exchanger with an external source of steam to provide flow of steam through the coil plate heat exchanger as the heat exchange media and returning the condensate to the source of steam for reheating.

2. The method as defined in claim 1 together with the step of isolating the coil plate heat exchangers into a plurality of longitudinally and circumferentially spaced coil plate heat exchangers, each of which includes a steam inlet connected directly with a source of steam at the upper end of the coil plate heat exchanger and directly connected to a condensate return line at the lower end of the coil plate heat exchanger to maintain even heating of the pressure vessel and tires therein being retreaded.

* * * * *